J. B. BRENNAN & W. TUCKER.
Middlings-Separators.
No. 153,043. Patented July 14, 1874.
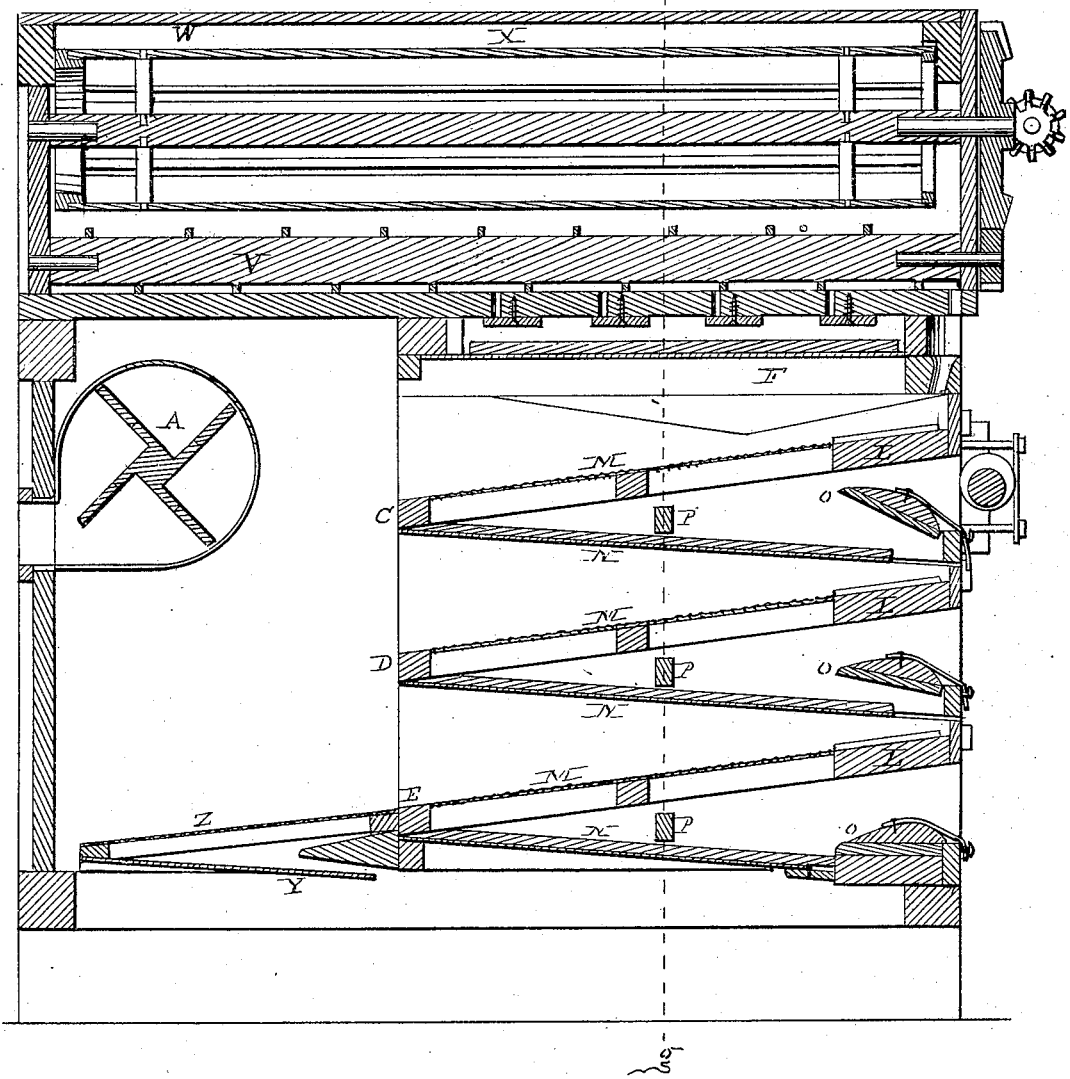

UNITED STATES PATENT OFFICE.

JOHN B. BRENNAN AND WILLIAM TUCKER, OF PARIS, ILLINOIS.

IMPROVEMENT IN MIDDLINGS-SEPARATORS.

Specification forming part of Letters Patent No. 153,043, dated July 14, 1874; application filed June 29, 1874.

*To all whom it may concern:*

Be it known that we, JOHN B. BRENNAN and WILLIAM TUCKER, both of Paris, Edgar county, Illinois, have made and invented a new and useful Invention in Middlings-Separators, of which the following is a specification:

Our invention relates to that class of machines which are made use of for the purpose of separating or purifying the middlings or coarser parts of flour, and is designed to be supplemental to, and an improvement upon, our machine described in the Letters Patent numbered 120,706, granted to us on the 7th day of November, 1871, for an improvement in middlings-separators.

In the accompanying drawings, Figure 1 is a longitudinal vertical section of a machine embodying our invention.

In the drawings, A is a suction-fan, arranged to draw the air through the screens C D E, one part of each of which, L, is solid, and the other part, M, perforated or made of cloth. The said screens are arranged in the frame F, their ends toward the fan A being inclined downward, and immediately below them are the pieces N, inclined in an opposite direction, upon which middlings that are delivered upon the upper screen, by the means hereinafter described, and which fall through the parts M, pass until they reach the hopper below the screen E, from whence they are moved out of the machine. O are adjustable valves, appropriately attached so as to be used to regulate the drafts of air through the several screens.

All of these parts are shown in the aforesaid Letters Patent, and we do not claim them except as they are therein described; but we have discovered that a part of the middlings, by reason of imperfect adjustment of the valves and otherwise, are carried by the draft and action of the screens beyond the points thereof, and, falling upon the floor of the machine, are lost. To prevent this loss is one of the objects of the present invention, and it is effected by means of the sieve Z, which is attached so as to be a continuation of the screen E. Below it is the conductor-board Y, inclined in an opposite direction, upon which the middlings fall and pass out of the machine.

In the aforesaid Letters Patent, a sieve is provided at the top of the machine, for which we substitute in the present invention a reel, X, with other parts, designed to coact in delivering the fine flour and finer middlings, so that they pass out of the machine, while the other parts of the material acted upon are conveyed to the screen C.

The reel X is of usual construction, extending the length of the machine, being suitably inclosed in the box W, the lower interior parts of which are inclined toward each other to form a trough, in which, actuated by a gear-wheel attached to its shaft, which meshes with a corresponding wheel attached to the shaft of the reel X, is the worm V, that serves to convey the fine flour and middlings that pass through the cloth upon the reel along the trough until they fall through apertures in its bottom and are conveyed out of the machine, while the coarser middlings and other parts pass out of the end of the reel toward the screens, and down through suitable apertures upon the screen C, and from thence onward.

The operation of the machine is as follows: The valves O having been adjusted so as to direct the air upon each screen, as may be expedient, and the material to be treated placed in the reel X, the machine is set in motion. The finer flour and middlings, passing through the cloth of the reel, are conveyed out of the machine, while the remaining parts, falling from the end of the reel, pass down upon the screen C. The lighter parts, moving more rapidly than the heavy middlings upon the solid part of the screen, are the first to reach the current of air, and are drawn off, the middlings falling through upon the board N, thence downward to the screen D, and so on until they leave the machine, the currents being regulated, as aforesaid, so as to be of greater or less force, according to circumstances. But it will inevitably happen that some proportion of the middlings will be drawn beyond the edges of the screens, the drafts of air being in that direction, and we, therefore, provide the screen or sieve Z, upon which fall the middlings that do not pass through the other screens, and from thence reach the board Y and leave the machine.

Having thus described the nature and operation of our invention, what we claim as new and useful, and desire to secure by Letters Patent, is—

In a middlings-separator, the combination of the reel X, screens C D E, provided with the valves O, boards N, sieve Z, and fan A, substantially as and for the purpose specified.

JOHN B. BRENNAN.
     WILLIAM TUCKER.

Witnesses to signature of JOHN B. BRENNAN:

ROWLAND COX,
 DENNIS TINNEY.

Witnesses to signature of WILLIAM TUCKER:

A. W. SWINGS,
 WM. B. SHERIFF.